United States Patent [19]

Matsuda et al.

[11] Patent Number: 4,528,575

[45] Date of Patent: Jul. 9, 1985

[54] INK JET PRINTING HEAD

[75] Inventors: Tadashi Matsuda; Tsuneo Mizuno, both of Yokohama; Noboru Takada, Inagi, all of Japan

[73] Assignee: Fujitsu Limited, Kawasaki, Japan

[21] Appl. No.: 414,363

[22] PCT Filed: Dec. 28, 1981

[86] PCT No.: PCT/JP81/00423

§ 371 Date: Aug. 27, 1982

§ 102(e) Date: Aug. 27, 1982

[87] PCT Pub. No.: WO82/02363

PCT Pub. Date: Jul. 22, 1982

[30] Foreign Application Priority Data

Dec. 30, 1980 [JP] Japan .............................. 55-189538

[51] Int. Cl.³ ............................................ G01D 15/16

[52] U.S. Cl. ................................ 346/140 R; 400/126

[58] Field of Search .......................... 346/140 PD, 75; 400/126

[56] References Cited

U.S. PATENT DOCUMENTS

| | | | |
|---|---|---|---|
| 3,988,745 | 10/1976 | Sulton | 346/140 PD |
| 4,189,734 | 2/1980 | Kyser | 346/140 PD |
| 4,229,751 | 10/1980 | Tamai | 346/140 PD |
| 4,392,145 | 7/1983 | Parkola | 346/140 PD |

FOREIGN PATENT DOCUMENTS 54-35937 2/1979 Japan .

OTHER PUBLICATIONS

IBM Tech. Disc. Bull., v. 23 No. 7A 2, Dec. 80, Lee, Mills, and Talke, pp. 2955–2957.

IBM Tech. Disc. Bull., v. 20 No. 12, May 78, Anschel et al., pp. 5425–5428.

*Primary Examiner*—E. A. Goldberg

*Assistant Examiner*—M. Reinhart

*Attorney, Agent, or Firm*—Staas & Halsey

[57] ABSTRACT

An ink jet printing head which includes a head body provided with an ink filling port (18), a plurality of rows of nozzles ($32A_1$ through $32A_5$, $40B_1$ through $40B_5$) arrayed in a staggered formation, pressure chambers ($21A_1$, $21A_2$, . . . , $21B_1$, $21B_2$, . . . ), one for each of the nozzles, and ink passages ($28A_1$, . . . , $33A_1$, . . . , $38B_1$, . . . , $41B_1$, . . . ) connecting the ink filling port with the nozzles via corresponding pressure chambers. ($19A_1$ through $19A_5$, $19B_1$ though $19B_5$). The pressure chambers are formed inside the head body and adjacent to the surface of at least one side of the head body. Piezoelectric elements are mounted on the outside of the head body at positions corresponding to the pressure chambers.

8 Claims, 13 Drawing Figures

INK JET PRINTING HEAD

BACKGROUND OF THE INVENTION

The present invention relates to an ink jet printing head for printing letters, numerals or characters by ejecting drops of ink and more particularly to a drop-on-demand type of ink jet printing head.

An ink jet printing system can provide noiseless and direct printing on paper and can be advantageously used in particular for the printing of Chinese characters which has been increasingly demanded in recent years, and for high quality printing of English characters and numerals. There are various types of ink jet printing systems, e.g., charge control types, field control types, and drop-on-demand types. The drop-on-demand type is the most promising of these because of its simple printing mechanism.

FIG. 1 illustrates a conventional ink jet printing head for a drop-on-demand type printing system, as disclosed in Japanese Examined Patent Publication (Kokoku) No. 54-35937. In FIG. 1, reference numeral 1 designates a substrate, 2 a cover, and 3 a piezoelectric element. The substrate 1 is made from special ceramics. The upper surface of the substrate is provided with a plurality of recess-like nozzles 4 arrayed in a row perpendicular to the direction of travel of the printing head. Also provided are a plurality of recess-like pressure chambers 5 which communicate with the nozzles 4, and a common ink chamber 6 which communicates the the pressure chambers 5 to supply ink. The cover 2 is mounted on the upper surface of the substrate 1 and is provided with an ink filling port 7 for supplying ink into the common ink chamber 6. The piezoelectric elements 3, each being strip-shaped, are mounted on the upper surface of the cover 2 at positions corresponding to the pressure chambers 5. In this construction, the nozzles 4 are arrayed in a row, as described above.

It is difficult to provide the high density array of nozzles required for hig quality printing. More specifically, high quality printing requires that print dots forming a letter be spaced every 0.1 mm, therefore, the nozzles must be spaced every 0.1 mm. However, a nozzle is generally 0.05 to 0.08 mm in width. This means that the sealing portion between the nozzles would have to be very small, i.e., in the range of 0.02 to 0.05 mm. It is not only difficult to manufacture such a structure, but it is also difficult to ensure reliable sealing. Moreover, the pressure chamber 5 must have a large area, as the displacement of the piezoelectric elements 3 caused by the application of voltage must be sufficiently large for the formation of ink drops. Accordingly, as illustrated in FIG. 2, the pressure chambers 5 and the piezoelectric elements 3 are in a radial arrangement, and the pressure chambers 5 are connected to the nozzles 4, arranged with a spacing of 0.1 mm, via the ink passages 8. As can be seen from FIG. 2, the ink passages 8 converge toward the nozzles 4 and, accordingly, are formed so that the widths thereof become narrower approaching the nozzles 4. Due to this construction, the lengths of the nozzles 4, particularly, the length of the nozzle 4 in the central region of the array, are large. This results in an increase in the frictional resistance to the flow of ink in the nozzle and obstructs the formation of the ink drops, thereby making it difficult to realize high quality printing.

SUMMARY OF THE INVENTION

The present invention aims to solve the problems mentioned above. It is an object of the invention to provide an ink jet printing head which can realize high quality printing and which is easy to manufacture.

An ink jet printing head according to the present invention includes a head body provided with an ink filling port. Inside the head body are rows of nozzles arrayed in a staggered formation, the same number of pressure chambers as nozzles, and ink passages for connecting the ink filling port with the nozzles via the pressure chambers. Piezoelectric elements are mounted on the surface of the head body at positions corresponding to the pressure chambers. The pressure chambers are formed in an inner layer in the vicinity of the surface of at least one side of the head body. This construction makes it possible to increase the nozzle spacing to two or more times the print dot spacing, thereby enabling easy nozzle formation, reliable nozzle sealing, and good ink drop formation.

Preferably, the head body is formed by laminating a plurality of layer plates. Secondly, it is advantageous that the head body be separable into a nozzle portion and a main head portion. The present invention will now be described based on embodiments thereof with reference to the accompanying drawings.

DESCRIPTION OF THE PREFERRED EMBODIMENTS

Figure 1:
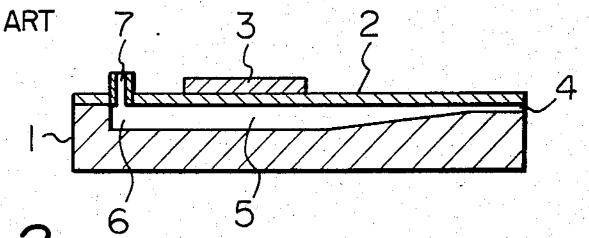
Fig. 1 PRIOR ART
FIG. 1 is a cross-sectional view of a conventional ink jet printing head.
Figure 2:
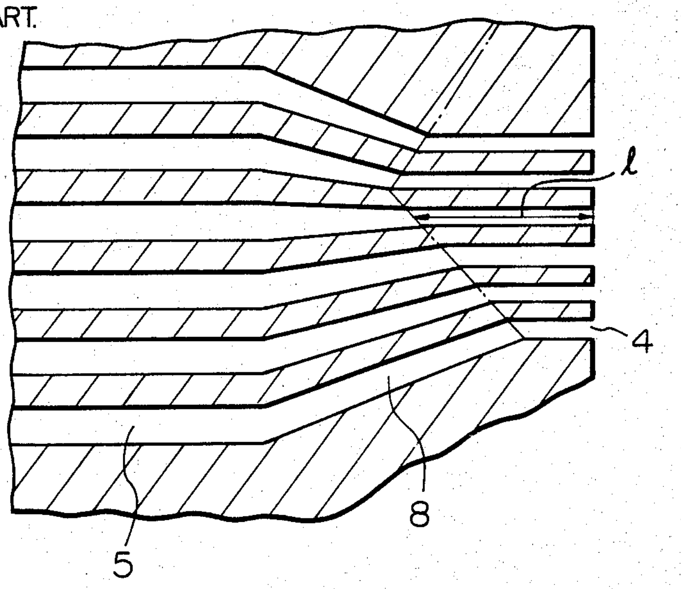
Fig. 2 PRIOR ART
FIG. 2 is a view illustrating essential portions of the ink jet printing head illustrated in FIG. 1.
Figure 3:
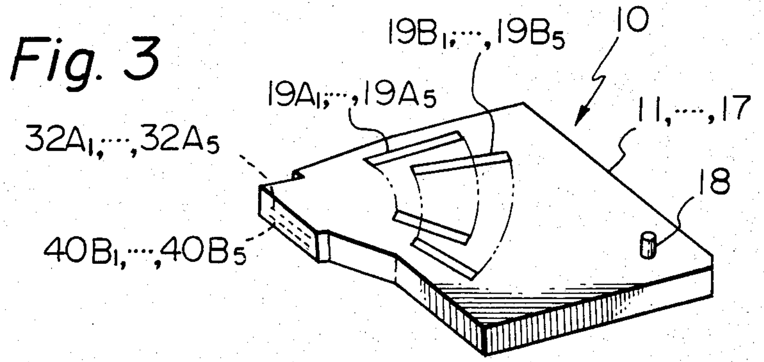
FIG. 3 is an external perspective view of a first embodiment of an ink jet printing head according to the present invention.
Figure 4:
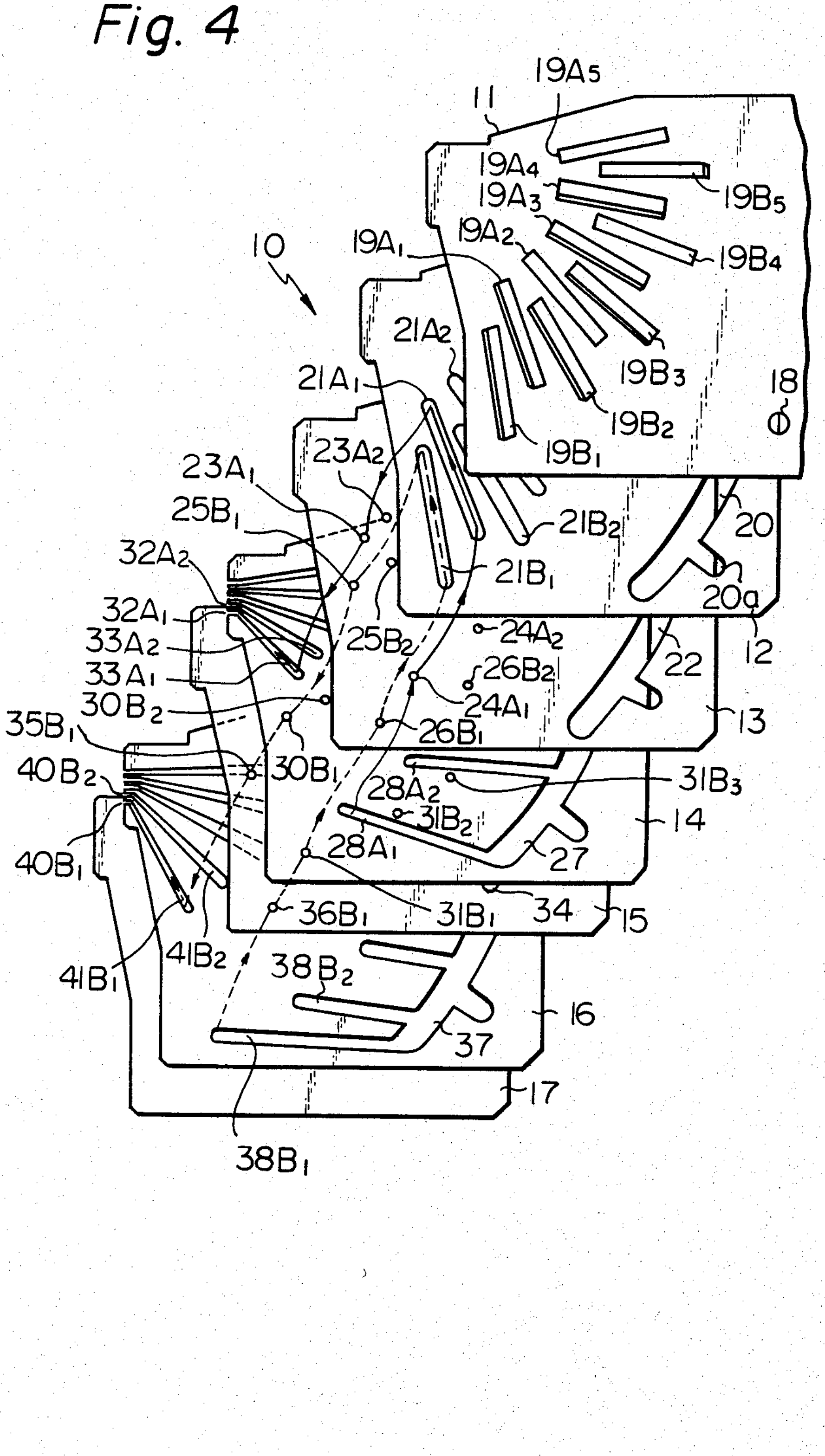
FIG. 4 is a perspective view of the first embodiment as disassembled.
Figure 5:
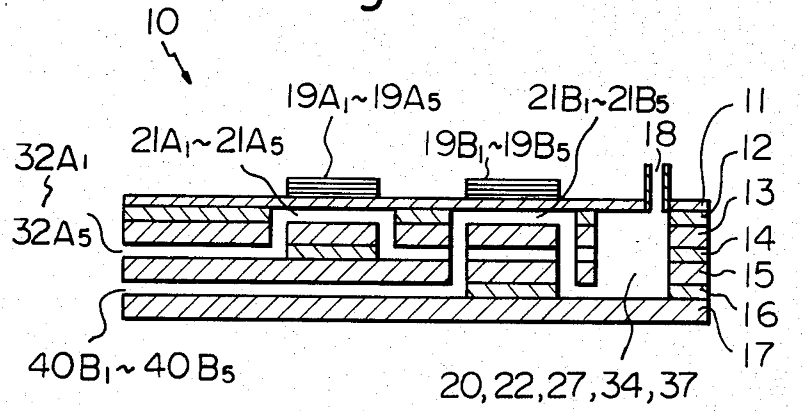
FIG. 5 is a cross-sectional view of the first embodiment.

The embodiments of the present invention will now be described with reference to FIGS. 3 through 13. FIGS. 3 through 6 illustrate an ink jet printing head 10, which is a first embodiment of the present invention. The ink jet printing head 10 includes a head body (FIG. 3), which has a multilayer plate structure (FIG. 4) comprising seven layer plates 11 through 17, and a plurality (10 in this embodiment) of piezoelectric elements $\mathbf{19A_1}$ through $\mathbf{19A_5}$ and $\mathbf{19B_1}$ through $\mathbf{19B_5}$, which are mounted on one external side surface of the head body.

The layer plates 11 through 17 (FIGS. 4 and 5) are of a uniform size and are made of a metal material of excellent corrosion resistance, for example, stainless steel. The first layer plate 11 is a cover plate and is provided with an ink filling port 18 formed by etching. The piezoelectric elements $\mathbf{19A_1}$ through $\mathbf{19A_5}$ and $\mathbf{19B_5}$ are aligned radially on the external surface of the plate 11 in two arcs.

The second layer plate (pressure chamber layer plate) 12 is provided with a common ink chamber 20 and 10 pressure chambers $\mathbf{21A_1}$, $\mathbf{21A_2}$, . . . , $\mathbf{21B_1}$, $\mathbf{21B_2}$, . . . , formed by etching. The common ink chamber 20 communicates with the ink filling port 18 via a branch 20*a*. The pressure chambers $\mathbf{21A_1}$, $\mathbf{21A_2}$, . . . , $\mathbf{21B_1}$, $\mathbf{21B_2}$, . . . are disposed at positions corresponding to the piezoelectric elements $\mathbf{19A_1}$ through $\mathbf{19A_5}$ and $\mathbf{19B_1}$ through $\mathbf{19B_5}$, respectively.

The third layer plate 13 is provided with a common ink chamber 22 and twenty holes $\mathbf{23A_1}$, $\mathbf{23A_2}$, . . . , $\mathbf{24A_1}$, $\mathbf{24A_2}$, . . . , $\mathbf{25B_1}$, $\mathbf{25B_2}$, . . . , $\mathbf{26B_1}$, $\mathbf{26B_2}$, . . . , formed by etching. The common ink chamber 22 is aligned with the common ink chamber 20. The holes $\mathbf{23A_1}$, $\mathbf{23A_2}$, . . . and $\mathbf{24A_1}$, $\mathbf{24A_2}$, . . . communicate with first ends (upper ends in FIG. 4) and second ends (lower ends in FIG. 4) of the pressure chambers $\mathbf{21A_1}$, $\mathbf{21A_2}$, . . . , respectively. The holes $\mathbf{25B_1}$, $\mathbf{25B_2}$, . . . and $\mathbf{26B_1}$, $\mathbf{26B_2}$, . . . communicate with first and second ends of the pressure chambers $\mathbf{21B_1}$, $\mathbf{21B_2}$, . . . , respectively.

The fourth layer plate (nozzle layer plate) 14 is provided with a common ink chamber 27, five ink supply passages $\mathbf{28A_1}$, $\mathbf{28A_2}$, . . . , connected to the ink chamber 27, ten holes $\mathbf{30B_1}$, $\mathbf{30B_2}$, . . . , $\mathbf{31B_1}$, $\mathbf{31B_2}$, . . . , and ink delivery passages $\mathbf{33A_1}$, $\mathbf{33A_2}$, . . . , connected to five nozzles $\mathbf{32A_1}$, $\mathbf{32A_2}$, . . . , and $\mathbf{32A_5}$, respectively formed by etching. The common ink chamber 27 is aligned with the common ink chamber 22. The ends of the ink supply passages $\mathbf{28A_1}$, $\mathbf{28A_2}$, . . . communicate with the holes $\mathbf{24A_1}$, $\mathbf{24A_2}$, . . . , respectively. The holes $\mathbf{30B_1}$, $\mathbf{30B_2}$, . . . communicate with the holes $\mathbf{25B_1}$, $\mathbf{25B_2}$, . . . , respectively. The holes $\mathbf{31B_1}$, $\mathbf{31B_2}$, . . . communicate with the holes $\mathbf{26B_1}$, $\mathbf{26B_2}$, . . . , respectively. The ends of the ink delivery passages $\mathbf{33A_1}$, $\mathbf{33A_2}$, . . . , connected to the nozzles $\mathbf{32A_1}$, $\mathbf{32A_2}$, . . . , communicate with the holes $\mathbf{23A_1}$, $\mathbf{23A_2}$, respectively.

The fifth layer plate 15 is provided with a common ink chamber 34 and ten holes $\mathbf{35B_1}$, . . . , $\mathbf{36B_1}$, . . . , formed by etching. The common ink chamber 34 is aligned with the common ink chamber 27. The holes $\mathbf{35B_1}$, . . . communicate with the holes $\mathbf{30B_1}$, $\mathbf{30B_2}$, . . . , respectively. The holes $\mathbf{36B_1}$, . . . communicate with the holes $\mathbf{31B_1}$, $\mathbf{31B_2}$, . . . , respectively.

The sixth layer plate (nozzle layer plate) 16 is provided with a common ink chamber 37, five ink supply passages $\mathbf{38B_1}$, $\mathbf{38B_2}$, . . . , and ink delivery passages $\mathbf{41B_1}$, $\mathbf{41B_2}$, . . . , connected to five nozzles $\mathbf{40B_1}$, $\mathbf{40B_2}$, . . . , and $\mathbf{40B_5}$, formed by etching. The common ink chamber 37 is aligned with the the common ink chamber 34. The ends of the ink supply passages $\mathbf{38B_1}$, $\mathbf{38B_2}$, . . . communicate with the holes $\mathbf{36B_1}$ . . . , respectively. The ends of the ink delivery passages $\mathbf{41B_1}$, $\mathbf{4B_2}$, . . . , communicate with the holes $\mathbf{35B_1}$, . . . , respectively. The seventh layer plate 17 is a solid cover plate.

Figure 6:
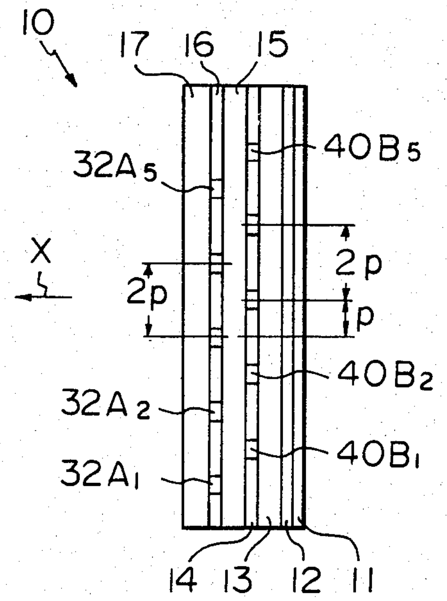
FIG. 6 is a front view of the first embodiment, illustrating a nozzle-formed surface.

The plates 11 through 17 described above are laminated as illustrated in FIGS. 5 and 6 and bonded together to form the head body provided with the ink filling port, nozzles, pressure chambers, and ink passages for the supply of ink from the ink filling port to the nozzles via the common ink chamber and the pressure chambers. The nozzles $\mathbf{32A_1}$ through $\mathbf{32A_5}$ and $\mathbf{40B_1}$ through $\mathbf{40B_5}$, as illustrated in FIG. 6, are arrayed in two rows in a staggered formation in the direction perpendicular to the head-scanning direction X.

For bonding the layer plates during the process of laminating the layer plates, a diffusion bonding technique is reliable and effective. In this technique, the plates, after being placed one over another, are heated in a vacuum, while being pressed together, to adhere closely to one another. It is advantageous that the layer plates be made of a uniform material to improve the reliability of the diffusion bonding and prevent galvanic corrosion.

The printing head 10 is charged with ink via the ink filling port 18, and the required piezoelectric elements are driven at the proper time to eject drops of ink from the nozzles, thereby performing the printing on a printing paper disposed in the front of the nozzles. The process of ejecting ink drops using this print head will now be described.

First, one of the A-series of piezoelectric elements $\mathbf{19A_1}$ through $\mathbf{19A_5}$, corresponding to the first row of nozzles $\mathbf{32A_1}$ through $\mathbf{32A_5}$ formed in the fourth layer plate 14, can be driven, for example, the piezoelectric element $\mathbf{19A_1}$. This causes the ink pressure in the pressure chamber $\mathbf{21A_1}$ to increase. This pressure is transmitted to the nozzle $\mathbf{32A_1}$ via the hole $\mathbf{23A_1}$ and the ink delivery passage $\mathbf{33A_1}$, as illustrated by the solid line arrow in FIG. 4, thereby ejecting a drop of ink from the nozzle $\mathbf{32A_1}$. The pressure chamber $\mathbf{21A_1}$ is charged with ink, via the ink filling port 18, the common ink chambers 20, 22, and 27, the ink supply passage $\mathbf{28A_1}$, and the hole $\mathbf{24A_1}$.

Second, one of the B-series of piezoelectric elements $\mathbf{19B_1}$ through $\mathbf{19B_5}$, corresponding to the second row of nozzles $\mathbf{40A_1}$ through $\mathbf{40A_5}$ formed in the sixth layer plate 16, can be driven, for example, the piezoelectric element $\mathbf{19B_1}$. This causes the ink pressure in the corresponding pressure chamber $\mathbf{21B_1}$ to increase. This pressure is transmitted to the nozzle $\mathbf{40B_1}$ via the holes $\mathbf{25B_1}$, $\mathbf{30B_1}$, and $\mathbf{35B_1}$ and the ink delivery passage $\mathbf{41B_1}$, as illustrated by the broken line arrow in FIG. 4, thereby ejecting a drop of ink from the nozzle $\mathbf{40B_1}$. The pressure chamber $\mathbf{21B_1}$ is charged with ink via the ink filling port 18, the common ink chambers 20, 22, 27, 34, and 37, the ink supply passage $\mathbf{38B_1}$ and the holes $\mathbf{36B_1}$, $\mathbf{31B_1}$, and $\mathbf{26B_1}$.

An ink jet printing head constructed as described above is illustrated in FIG. 6. The arrangement of nozzles in two staggered nozzle rows makes possible a nozzle spacing of 2*p*, for example 0.2 mm, in each row of nozzles. This results in an overall nozzle spacing p, that is 0.1 mm, thereby making it possible to realize satisfactory print quality. In other words, the nozzles can be spaced in each row by as much as 0.2 mm to obtain a print dot spacing of 0.1 mm. Accordingly, the formation of nozzles is simplified and the sealing between nozzles is ensured. Furthermore, it is possible to make the cross-sectional areas of the ink delivery passages connecting the pressure chambers and the nozzles sufficiently large. As a result, the frictional resistance to the flow becomes negligible, and the formation of ink drops is satisfactory. Therefore, the various conventional problems can be solved. It should be noted that the nozzles can be spaced in each row at, for example, 0.3 mm or more if three or more nozzle layer plates are provided to create three or more rows of nozzles.

Further, the pressure chambers are formed collectively in the second layer plate, and, accordingly, it is possible to collect the piezoelectric elements on one external surface of the head body. This feature results in the advantages of easy manufacture and the availability of the external surface on the opposite side of the ink jet printing head (i.e., the external side surface of the seventh layer plate 17) for mounting.

Figure 7:
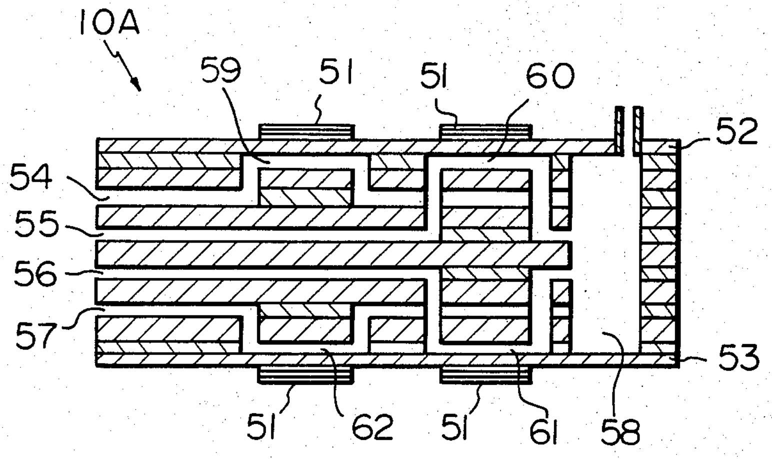
FIG. 7 is a cross-sectional view of a second embodiment of an ink jet printing head according to the present invention.
Figure 8:
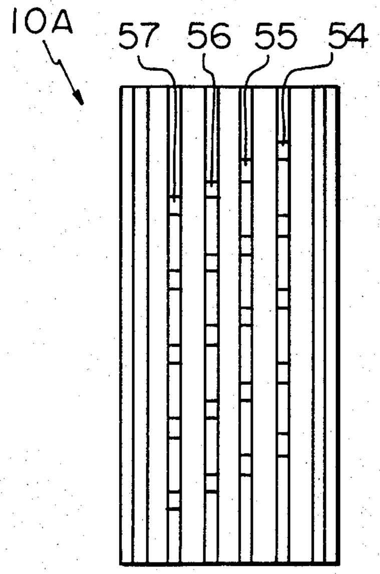
FIG. 8 is a front view of the second embodiment, illustrating a nozzle-formed surface.

The first embodiment described above, however, has a disadvantage in that the provision of more nozzles necessitates an increased number of piezoelectric elements and if these elements are mounted only on the top cover, the top cover must be made larger. FIGS. 7 and 8 illustrate a printing head 10A, which is a second embodiment and is effective for eliminating the above-mentioned disadvantage.

The printing head 10A has a head body which is composed of 13 layer plates. Piezoelectric elements 51 are distributed onto the first layer plate (top cover) 52 and the 13th layer plate (bottom cover) 53. This construction makes it possible to mount twice as many piezoelectric elements as that of the aforementioned embodiment with the same number of elements on the top cover. This results in twice as many nozzles. The fourth, sixth, eighth, and 10th layer plates are provided with first, second, third and fourth rows of nozzles 54, 55, 56, and 55, respectively. The second layer plate is provided with first and second groups of pressure chambers 59 and 60, respectively. The 12th layer plate is provided with third and fourth groups of pressure chambers 61 and 62, respectively. The nozzles in the first row 54 communicate with a common ink chamber 58, via the corresponding pressure chambers 59 in the first group. Similarly, the nozzles in the second, third, and fourth rows communicate with the common ink chamber 58, via the corresponding pressure chambers 60, 61, and 62 in the second, third and fourth groups, respectively. The technique of forming the ink passages interconnecting the nozzles, the pressure chambers, and the common ink chamber, the process of jetting ink, and the technique of bonding the layer plates are similar to those in the first embodiment.

Figure 9:
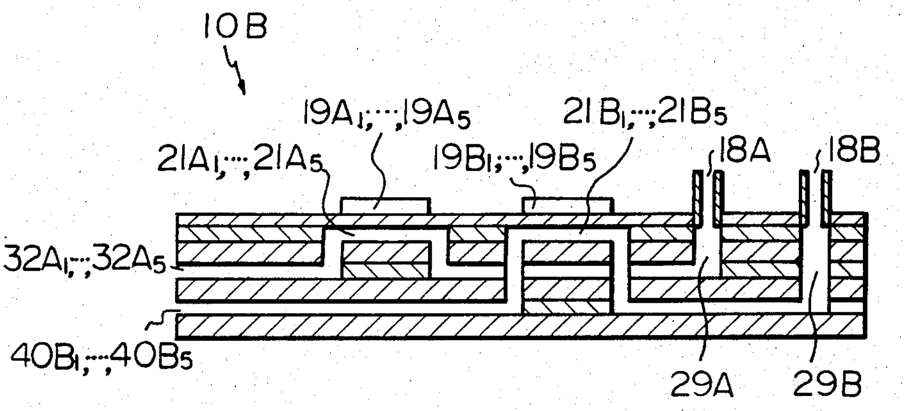
FIG. 9 is a cross-sectional view of a third embodiment of an ink jet printing head according to the present invention.

Both of the embodiments described above are one-color ink jet printing heads. However, in accordance with the present invention, it is easy to provide a multi-color ink jet printing head. FIG. 9 illustrates an embodiment of a two-color ink jet printing head. This ink jet printing head 10B is essentially similar in structure to the ink jet printing head 10 illustrated in FIGS. 3 through 6. It differs in that two independent ink filling ports 18A and 18B and two independent ink chambers 29A and 29B are provided. The first ink chamber 29A communicates with the nozzles $\mathbf{32A_1}$ through $\mathbf{32A_5}$, via the pressure chambers $\mathbf{21A_1}$ through $\mathbf{21A_5}$, and the second ink chamber 29B communicates with the nozzles $\mathbf{40B_1}$ through $\mathbf{40B_5}$, via the pressure chambers $\mathbf{21B_1}$ through $\mathbf{21B_5}$. Therefore, if inks of different color are supplied via the ink filling ports 18A and 18B, two-color printing can be performed.

Figure 10:
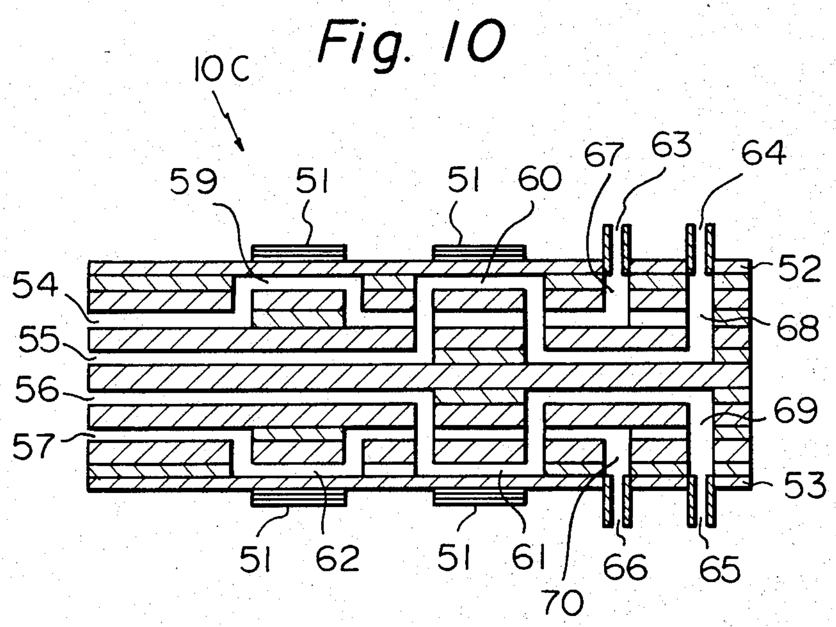
FIG. 10 is a cross-sectional view of a fourth embodiment of an ink jet printing head according to the present invention.

FIG. 10 illustrates an embodiment of a four-color ink jet printing head. This ink jet printing head 10C is essentially similar in structure to the ink jet printing head 10A illustrated in FIGS. 7 and 8. It differs in that four independent ink filling ports 63 through 66 and four independent ink chambers 67 through 70 are provided. The ink chambers 67 through 70 communicate with the rows of nozzles 54 through 57, via the groups of pressure chambers 59 through 62. Therefore, if inks of different colors are supplied via the ink filling ports 63 through 66, four-color printing can be performed.

Figure 11:
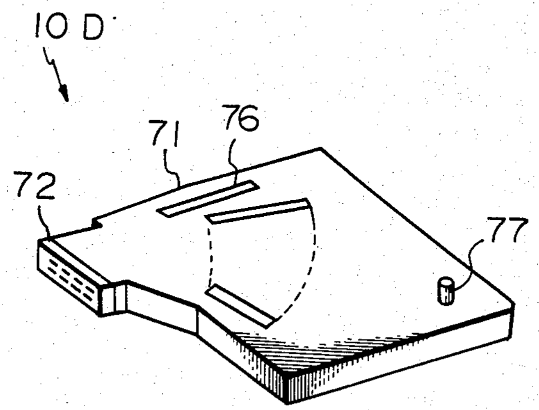
FIG. 11 is an external perspective view of a fifth embodiment of an ink jet printing head according to the present invention.
Figure 12:
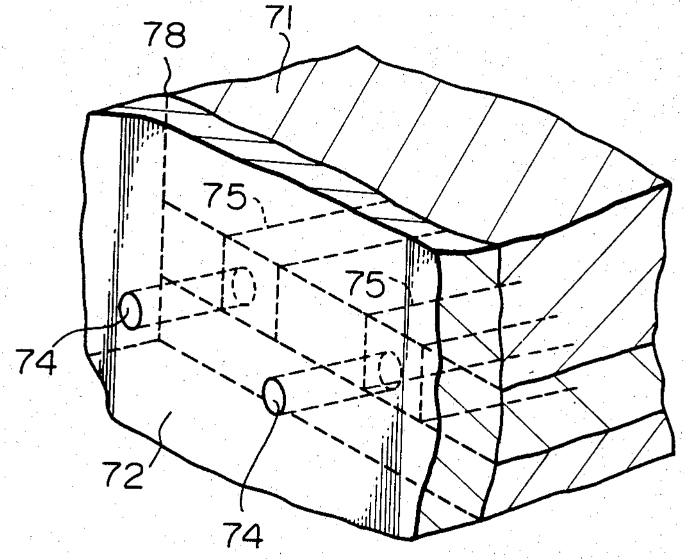
FIG. 12 is an enlarged view of the essential portions of the fifth embodiment illustrated in FIG. 11.

In all embodiments described above, etching is used to form the nozzles, pressure chambers, ink chambers, and the like in the layer plates. However, there is a problem in that method of forming the head, particularly for the nozzles. The nozzles greatly affect the formation of ink drops, so it is desirable that the shapes of nozzles be uniform. In general, however, the shapes of nozzles formed by an etching process are not uniform, resulting in a lack of uniformity of the direction of ink drop formation. Therefore, an improvement is required to realize high print quality. An embodiment of an improved ink jet printing head is illustrated in FIGS. 11 and 12.

This ink jet printing head 10D has a head body essentially similar to those of the ink jet printing heads 10 through 10C described above, but comprising a main head portion 71 and a nozzle plate 72. The main head portion 71 is provided with an ink filling port 77, pressure chambers (not illustrated), and ink passages including ink delivery passages 75 (FIG. 12), but not with nozzles. The nozzle plate 72 is provided with nozzles 74. The nozzle plate 72 is attached to a front or nozzle surface 78 of the main body portion 71, in which the ink delivery passages are opened, as illustrated in the figures, so that the nozzles 74 communicate with the ink delivery passages 75. This construction makes it possible to form the nozzles 74 into accurate shapes by using any other technique besides etching, thereby resulting in the improvement in printing characteristics and, thus, the realization of high quality printing. In this construction, if a filler such as a room temperature-hardening rubber, for example an "RTB rubber" (SHINETSU SILICON), is applied to the contact surface 78 of the main head portion 71 and the nozzles 72, an improved airtight sealing between the contact surfaces is achieved. In FIG. 11, the reference numeral 76 designates the piezoelectric elements.

Figure 13:
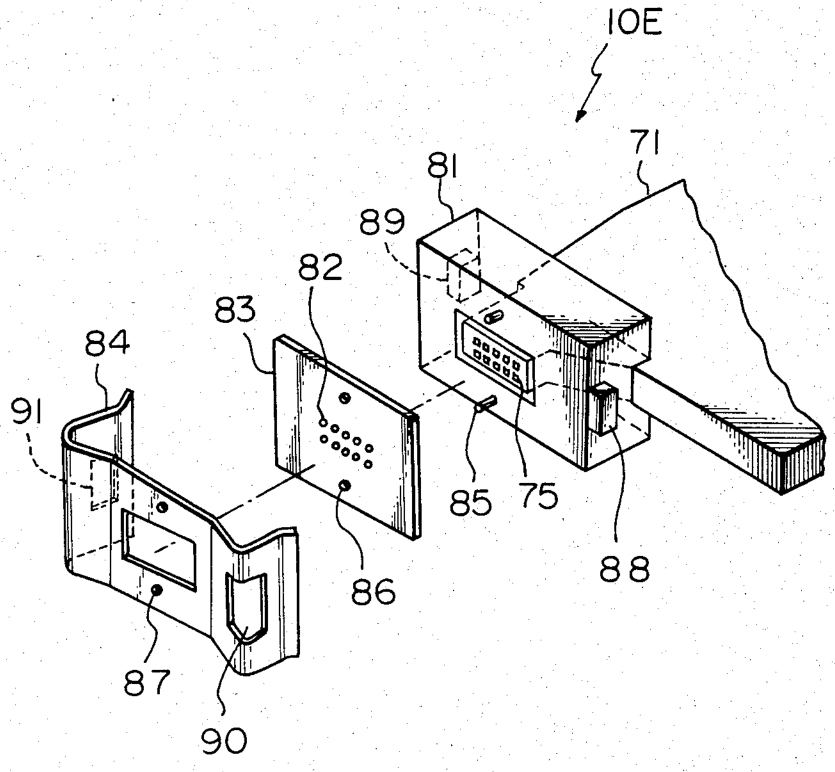
FIG. 13 is a perspective view of essential portions, s disassembled, of a sixth embodiment of an ink jet printing head according to the present invention.

Furthermore, nozzles easily become clogged and if the nozzle plate is designed to be removable, it is possible to unclog the nozzles by removing and washing the nozzle plate. FIG. 13 illustrates an ink jet printing head in which the nozzle plate is removable. This ink jet printing head 10E has the same main head portion 71 as illustrated in FIG. 11, to which a mounting member 81 is secured. A nozzle plate 83, which is provided with nozzles 82, is mounted on the member 81 and held by a retaining spring 84. Alignment of the ink delivery passages 75 of the main head portion 71 and the nozzle plate 83 and the spring 84 is achieved by means of guide pins 85 and guide holes 86 and 87, formed in the above-mentioned elements. Moreover, the mounting member 81 is provided with projections 88 and 89, which pass through the engage holes 90 and 91 formed in the spring 84, to secure the nozzle plate 83.

It should be understood that while the present invention has been described above with reference to preferred embodiments, variations and modifications can be made thereto within the spirit and scope of the present invention set forth in the claims.

We claim:

1. A laminated ink jet printing head, comprising:

a first cover plate having inner and outer surfaces with piezoelectric elements mounted on the outer surface and having at least one ink port formed therethrough;

a pressure chamber plate, disposed adjacent to the inner surface of said first cover plate, having pressure chambers formed therethrough in alignment with the piezoelectric elements;

a second cover plate;

nozzle plates, disposed between said pressure chamber plate and said second cover plate, each of said nozzle plates having ink supply passages and ink delivery passages formed therethrough, the ink delivery passages being opened at one edge of each of said nozzle plates to provide a row of nozzles in each of said nozzle plates, the row of nozzles of one of said nozzle plates being offset with respect to the row of nozzles of an adjacent nozzle plate, each of the ink supply passages and each of the ink delivery passages corresponding to one of the pressure chambers; and partition plates, each of said partition plates being disposed between said pressure chamber plate and one of said nozzle plates and between said nozzle plates, at least some of said pressure chamber plate, said nozzle plates and said partition plates having connecting passages formed therethrough which connect the ink port with the ink supply passages, the pressure chambers and the ink delivery passages.

2. An ink jet printing head according to claim 1, wherein said first cover plate has ink ports, each of the ink ports communicating with one of the rows of nozzles.

3. An ink jet printing head according to claim 1, wherein said ink jet printing head has a nozzle surface, the edge of each of said nozzle plates at which the ink delivery passages open being at the nozzle surface, and wherein said ink jet printing head further comprises a nozzle cover plate, attached to the nozzle surface, having nozzle orifices formed therethrough in alignment with the rows of nozzles.

4. An ink jet printing head according to claim 3, wherein said nozzle cover plate is removable from the nozzle surface.

5. A laminated ink jet printing head, comprising:

two cover plates, each having inner and outer surfaces with piezoelectric elements mounted on the outer surface of each of said cover plates, at least one of said cover plates having at least one ink port formed therethrough;

two pressure chamber plates, each disposed adjacent to the inner surfaces of one of said cover plates, having pressure chambers formed therethrough in alignment with the piezoelectric elements, nozzle plates, disposed between said pressure chamber plates, each of said nozzle plates having ink supply passages and ink delivery passages formed therethrough, the ink delivery passages being opened at one edge of each of said nozzle plates to provide a row of nozzles in each of said nozzle plates, the row of nozzles of one of said nozzle plates being offset with respect to the row of nozzles of an adjacent nozzle plate, each of the ink supply passages and each of the ink delivery passages corresponding to one of the pressure chambers; and partition plates, each of said partition plates being disposed between two adjacent ones of said pressure chamber plates and said nozzle plates, at least some of said pressure chamber plates, said nozzle plates and said partition plates having connecting passages formed therethrough which connect the ink port with the ink supply passages, the pressure chambers and the ink delivery passages.

6. An ink jet printing head according to claim 5, wherein said cover plates have ink ports, each of the ink ports communicating with one of the rows of nozzles.

7. An ink jet printing head according to claim 5, wherein said ink jet printing head has a nozzle surface, the edge of each of said nozzle plates at which the ink delivery passages open being at the nozzle surface of said ink jet printing head, and wherein said ink jet printing head further comprises a nozzle cover plate, attached to the nozzle surface of said ink jet printing head, having nozzle orifices formed therethrough in alignment with the rows of nozzles.

8. An ink jet printing head according to claim 7, wherein said nozzle cover plate is removable from the nozzle surface.

* * * * *

UNITED STATES PATENT AND TRADEMARK OFFICE

CERTIFICATE OF CORRECTION

PATENT NO. : 4,528,575

DATED : JULY 9, 1985

INVENTOR(S) : TADASHI MATSUDA ET AL.

It is certified that error appears in the above-identified patent and that said Letters Patent is hereby corrected as shown below:

FRONT PAGE [75] "Inventors: Tadashi Matsuda; Tsuneo Mizuno, both of Yokohama; Noboru Takada, Inagi, all of Japan:

should be

--Inventors: Tadashi Matsuda; Tsuneo Mizuno, both of Yokohama; Noboru Takada, Machida; Shin Araki; Michio Shimura, both of Yokohama; Michinori Kutami, Kawaguchi, all of Japan--.

[56] References Cited, line 1,

"3,988,745 10/1976 Sulton.....346/140 PD" should be

--3,988,745 10/1976 Sultan.....346/140 PD--.

Col. 1, line 31, "the" (first occurrence) should be --with--;
line 63, after "length" insert --ℓ--.

UNITED STATES PATENT AND TRADEMARK OFFICE

CERTIFICATE OF CORRECTION

PATENT NO. : 4,528,575

DATED : JULY 9, 1985

INVENTOR(S) : TADASHI MATSUDA ET AL.

It is certified that error appears in the above-identified patent and that said Letters Patent is hereby corrected as shown below:

Col. 2, line 60, "s" should be --as--.

Col. 3, line 13, after "and" insert --$19B_1$ through--.

Col. 5, line 34, "55" (second occurrence) should be --57--.

Signed and Sealed this

*Fourteenth* Day of *January 1986*

[SEAL]

*Attest:*

DONALD J. QUIGG

*Attesting Officer* *Commissioner of Patents and Trademarks*